(12) United States Patent
Chung et al.

(10) Patent No.: US 8,814,411 B2
(45) Date of Patent: Aug. 26, 2014

(54) FLAT ILLUMINATION DEVICE

(71) Applicant: Radiant Opto-Electronics Corporation, Kaohsiung (TW)

(72) Inventors: Yuan-Chen Chung, Kaohsiung (TW); Wei-Hsuan Chen, Kaohsiung (TW); Li-Fei Wang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 13/753,494

(22) Filed: Jan. 29, 2013

(65) Prior Publication Data

US 2014/0133175 A1    May 15, 2014

(30) Foreign Application Priority Data

Nov. 9, 2012  (TW) ............................. 101141823 A

(51) Int. Cl.
*F21V 7/04* (2006.01)

(52) U.S. Cl.
CPC .................................. *G02B 6/0036* (2013.01)
USPC ............................................. 362/607; 362/620

(58) Field of Classification Search
USPC .......... 362/607, 620, 610, 615, 623, 624, 625
See application file for complete search history.

(56) References Cited

U.S. PATENT DOCUMENTS

| | | | | |
|---|---|---|---|---|
| 5,886,759 | A | * | 3/1999 | Mashino et al. ................ 349/65 |
| 7,922,380 | B2 | * | 4/2011 | Park .............................. 362/631 |
| 8,305,520 | B2 | * | 11/2012 | Kuramoto ....................... 349/62 |
| 2005/0180166 | A1 | * | 8/2005 | Hara et al. ..................... 362/606 |
| 2011/0043719 | A1 | * | 2/2011 | Thunhorst et al. ............. 349/58 |
| 2012/0081637 | A1 | * | 4/2012 | Su .................................. 349/65 |
| 2012/0275190 | A1 | * | 11/2012 | Matsumoto et al. .......... 362/609 |

FOREIGN PATENT DOCUMENTS

| | | |
|---|---|---|
| CN | 201207259 Y | 3/2009 |
| TW | I358686 B1 | 2/2012 |
| TW | I374995 | 10/2012 |

* cited by examiner

*Primary Examiner* — Evan Dzierzynski
(74) *Attorney, Agent, or Firm* — CKC & Partners Co., Ltd.

(57) ABSTRACT

A flat illumination device is provided, and includes a frame, a light guide plate, and at least one light source. The frame includes an inner wall, wherein the inner wall has a reflective surface. The light guide plate is disposed in the frame, and has a first surface, a second surface opposite to the first surface, and at least one light incident surface adjoining the first and second surfaces. The first surface faces the reflective surface, and there is a distance between the first surface and the reflective surface. At least one pattern formed from mesh points or microstructures is disposed on at least one of the first surface and the second surface. The light source is disposed in the frame, and is adjacent to the light incident surface for providing light to the light guide plate.

16 Claims, 4 Drawing Sheets

FLAT ILLUMINATION DEVICE

RELATED APPLICATIONS

This application claims priority to Taiwan Patent Application Serial Number 101141823, filed on Nov. 9, 2012, which is herein incorporated by reference.

BACKGROUND

1. Field of Invention

This application relates to an illumination device, and more particularly to a flat illumination device having special light patterns.

2. Description of Related Art

An illumination device plays an important role in human daily life, and its applications may be seen in various buildings, transportation tools, or decorations, for example. To human being, the illumination device not only is a tool for providing illumination, but also has a great influence on human life.

A flat illumination device has a light source which may provide uniform and large-area illumination, and thus is more and more popular. The current flat illumination devices in the market mostly have some patterns on their lamp covers for achieving decoration effects. However, the decoration effects provided by the patterns disposed on the lamp covers do not have special changes and fail to meet the consumer requirements which demanding newness and change.

Hence, there is a need to provide a flat illumination device for overcoming the aforementioned disadvantages.

SUMMARY

An object of the present invention is to provide a flat illumination device for using at least one pattern formed from a plurality of mesh points or microstructures disposed on a first surface of a light guide plate and/or a second surface of the light guide plate opposite to the first surface to achieve effects of providing a uniform light source and generating artistic patterns.

Another object of the present invention is to provide a flat illumination device for using a reflective surface facing a first surface of the light guide plate to reflect a pattern formed on the first surface of the light guide plate and/or a second surface of the light guide plate opposite to the first surface, thereby generating a pattern with the effect of depth of field, and achieving an image effect of multiple patterns.

According to the aforementioned objects, an aspect of the present invention is to provide a flat illumination device. The flat illumination device includes a frame, a light guide plate and at least one light source. The frame includes an inner wall, wherein the inner wall has a reflective surface. The light guide plate is disposed in the frame, and has a first surface and a second surface opposite to the first surface, and at least one light incident surface. The first surface faces the reflective surface, and is spaced from the reflective surface at a distance, and at least one pattern formed from a plurality of mesh points or microstructures is disposed on at least one of the first surface and the second surface. The light incident surface adjoins the first surface and the second surface. The light source is disposed in the frame and is adjacent to the light incident surface for providing light to the light guide plate.

According to one embodiment of the present invention, the first surface and the second surface of the light guide plate both have the patterns disposed thereon.

According to another embodiment of the present invention, the reflective surface includes a planar surface.

According to yet another embodiment of the present invention, the reflective surface includes a curved surface.

According to yet another embodiment of the present invention, the flat illumination further includes a lamp cover disposed on the frame for covering the light guide plate.

Another aspect of the present invention is to provide a flat illumination device. The flat illumination device includes a frame, a light guide plate, a reflecting plate and at least one light source. The light guide plate is disposed in the frame, and has a first surface and a second surface opposite to the first surface, and at least one light incident surface, wherein at least one pattern formed from a plurality of mesh points or microstructures is disposed on at least one of the first surface and the second surface. The at least one light incident surface of the light guide plate adjoins the first surface and the second surface of the light guide plate of the light guide plate. The reflecting plate is disposed in the frame, wherein the reflecting plate having a reflective surface, and the reflective surface faces the first surface and is spaced from the first surface at a distance. The at least one light source is disposed in the frame and is adjacent to the at least one light incident surface for providing light to the light guide plate.

Therefore, applications of the embodiments of the present invention can achieve effects of providing a uniform light source and generating artistic patterns; generate a pattern with the effect of depth of field, and achieve an image effect of multiple patterns.

BRIEF DESCRIPTION OF THE DRAWINGS

The invention can be more fully understood by reading the following detailed description of the embodiment, with reference made to the accompanying drawings as follows.

DETAILED DESCRIPTION

In the following description, several specific details are presented to provide a thorough understanding of the device structures according to embodiments of the present invention. One skilled in the relevant art will recognize, however, that the embodiments of the present invention provide many applicable inventive concepts which can be practiced in various specific contents. The specific embodiments discussed hereinafter are used for explaining but not limited of the scope of the present invention.

Figure 1:
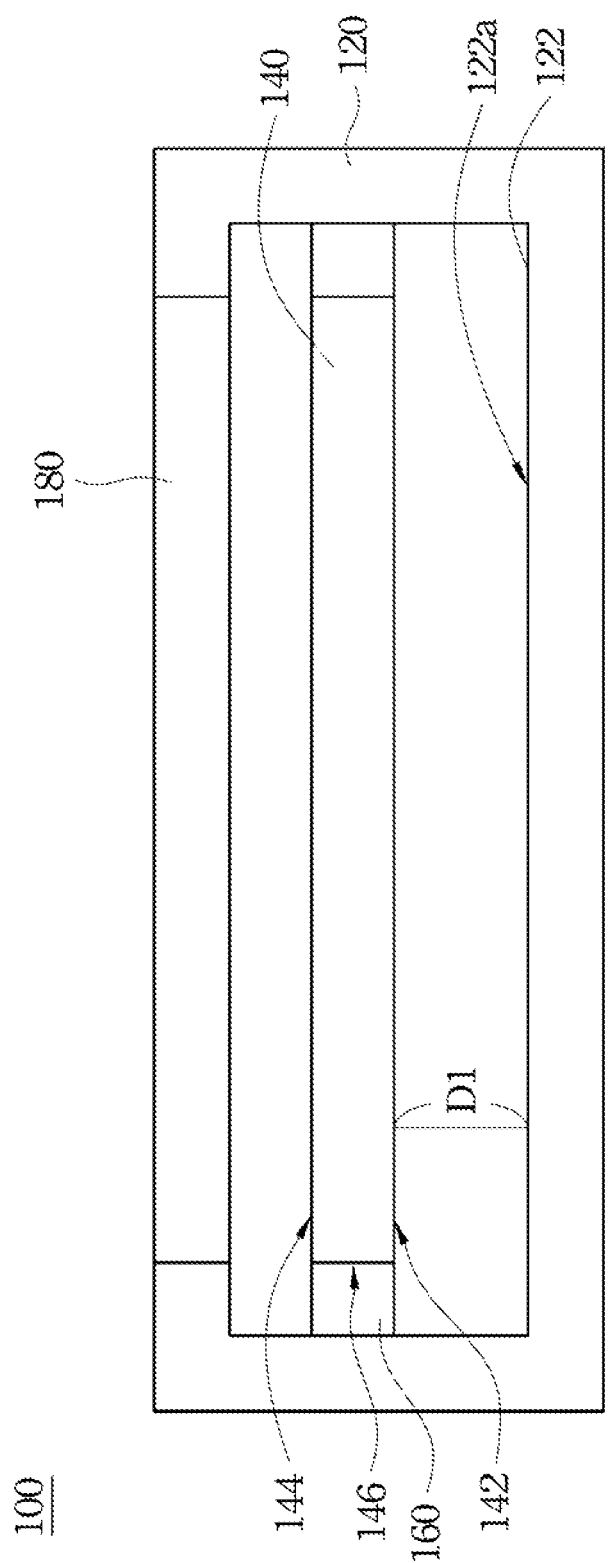
FIG. 1 is a schematic cross-sectional view of a flat illumination device according to an embodiment of the present invention.

Referring to FIG. 1, FIG. 1 is a schematic cross-sectional view of a flat illumination device 100 according to an embodiment of the present invention. Besides illumination, the flat illumination device 100 also may generate image effects of special light pattern changes. In this embodiment, the flat illumination device 100 includes a frame 120, a light guide plate 140 and at least one light source 160. In one embodiment, the flat illumination device 100 further includes a lamp cover 180, in which the lamp cover 180 is disposed on the frame 120 to cover the light guide plate 140 for preventing foreign matters from entering the flat illumination device 100. The at least one light source 160 is disposed in the frame 120 and is adjacent to at least one light incident surface 146 for providing light to the light guide plate 140. The at least one light source 160 can disposed on one or both sides of the light guide plate 140, or all around the light guide plate 140, according actual application requirements.

Such as shown in FIG. 1, the frame 120 includes an inner wall 122 having a reflective surface 122a. In one embodiment, the reflective surface 122a may have a high reflectivity due to the property of the material forming the inner wall 122. For example, the inner wall can be formed from stainless steel which has been treated by mirror polishing. In another embodiment, the reflective surface 122a can be formed by coating a material of high reflectivity on the inner wall 122 of the frame 120. On the other hand, the reflective surface 122a can be formed a planar surface (as shown in FIG. 1) or a curved surface (not shown) in accordance with the actual requirements of the flat illumination device 100.

Figure 2:
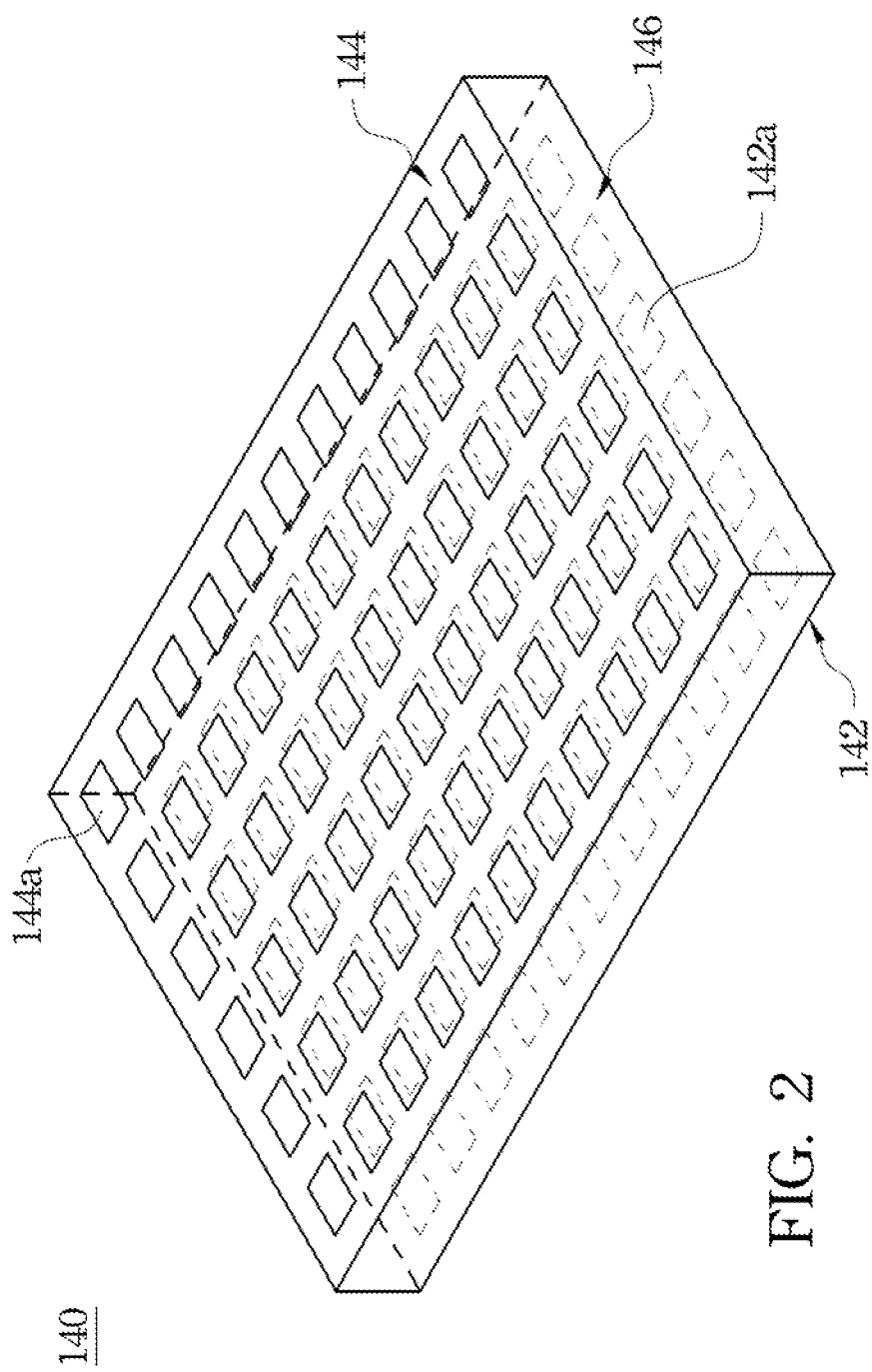
FIG. 2 is a schematic three-dimensional view showing a light guide plate of the flat illumination device according to the embodiment of the present invention.

Referring to FIG. 1 and FIG. 2 simultaneously, FIG. 2 is a schematic three-dimensional view showing a light guide plate of the flat illumination device according to the embodiment of the present invention. The light guide plate 140 is disposed in the frame 120, and has a first surface 142 and a second surface 144 opposite to the first surface 142, and the at least one light incident surface 146 adjoining the first surface 142 and the second surface 144. The first surface 142 faces the reflective surface 122a, and is spaced from the reflective surface 122a at a distance D1. As shown in FIG. 2, in one embodiment, both the first surface 142 and the second surface 144 have respective patterns 142a and 144a formed from a plurality of mesh points or microstructures. However, embodiments of the present invention are not limited thereto. In another embodiment, only one of the first surface 142 and the second surface 144 has a pattern formed thereon. It is worthy to be noted that the pattern 142a and the pattern 144a can be the same or different.

Figure 3:
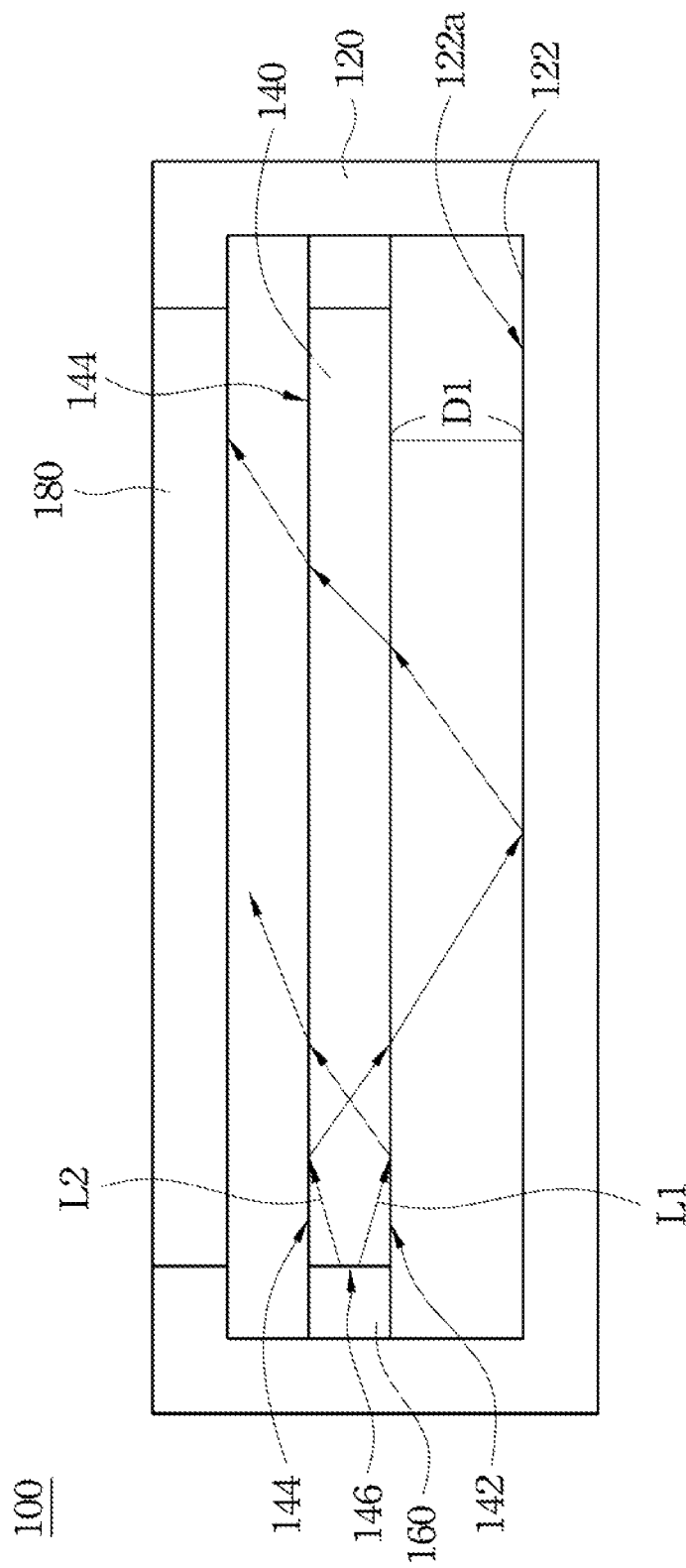
FIG. 3 is a schematic diagram showing light paths of the flat illumination device according to the embodiment of the present invention.

Referring to FIG. 2 and FIG. 3 simultaneously, FIG. 3 is a schematic diagram showing light paths of the flat illumination device according to the embodiment of the present invention. The flat illumination device 100 uses the pattern 142a and the pattern 144a respectively disposed on two opposite surfaces (the first surface 142 and the second surface 144) of the light guide plate 140 to achieve effects of providing a uniform light source and generating artistic patterns; and uses the reflective surface 122a to reflect the light passing through the pattern 142a and/or the pattern 144a disposed on the first surface 142 and/or the second surface 144, thereby generating a pattern with the effect of depth of field, and achieving an image effect of multiple patterns. As shown by a light path L1 after being reflected by the first surface 142, a portion of the light emitted from the light source 160 is refracted by the second surface 144 and then is emitted out through the lamp cover 180. As shown by a light path L2, after being reflected by the second surface 144, another portion of the light emitted from the light source 160 reaches the reflective surface 122a after being refracted by the first surface 142. After being reflected by the reflective surface 122a, the portion of the light is refracted by the first surface 142 and the second surface 144 respectively, and then is emitted out through the lamp cover 180. Both of the light paths L1 and L2 may achieve effects of providing a uniform light source and generating artistic patterns; and the light path L2 may generate a pattern with the effect of depth of field, and achieve an image effect of multiple patterns.

On the other hand, for the case in which only the second surface 144 has the pattern 144a disposed thereon, since the pattern 144a on the second 144 requires more times of refraction before being reflected to an observers eyes by the reflective surface 122a, it may generate a better image effect of depth of field than the case in which only the first surface 142 has the pattern 142a disposed thereon. Certainly, for the case in which both the first surface 142 and the second surface 144 have the pattern 142a and the pattern 144a respectively disposed thereon, the image effect generated thereby is more diversified.

Moreover, the thickness of the light guide plate 140, and the distance D1 between the light guide plate 140 and the reflective surface 122a also may affect the effect of light pattern changes generated by the flat illumination device 100.

Figure 4:
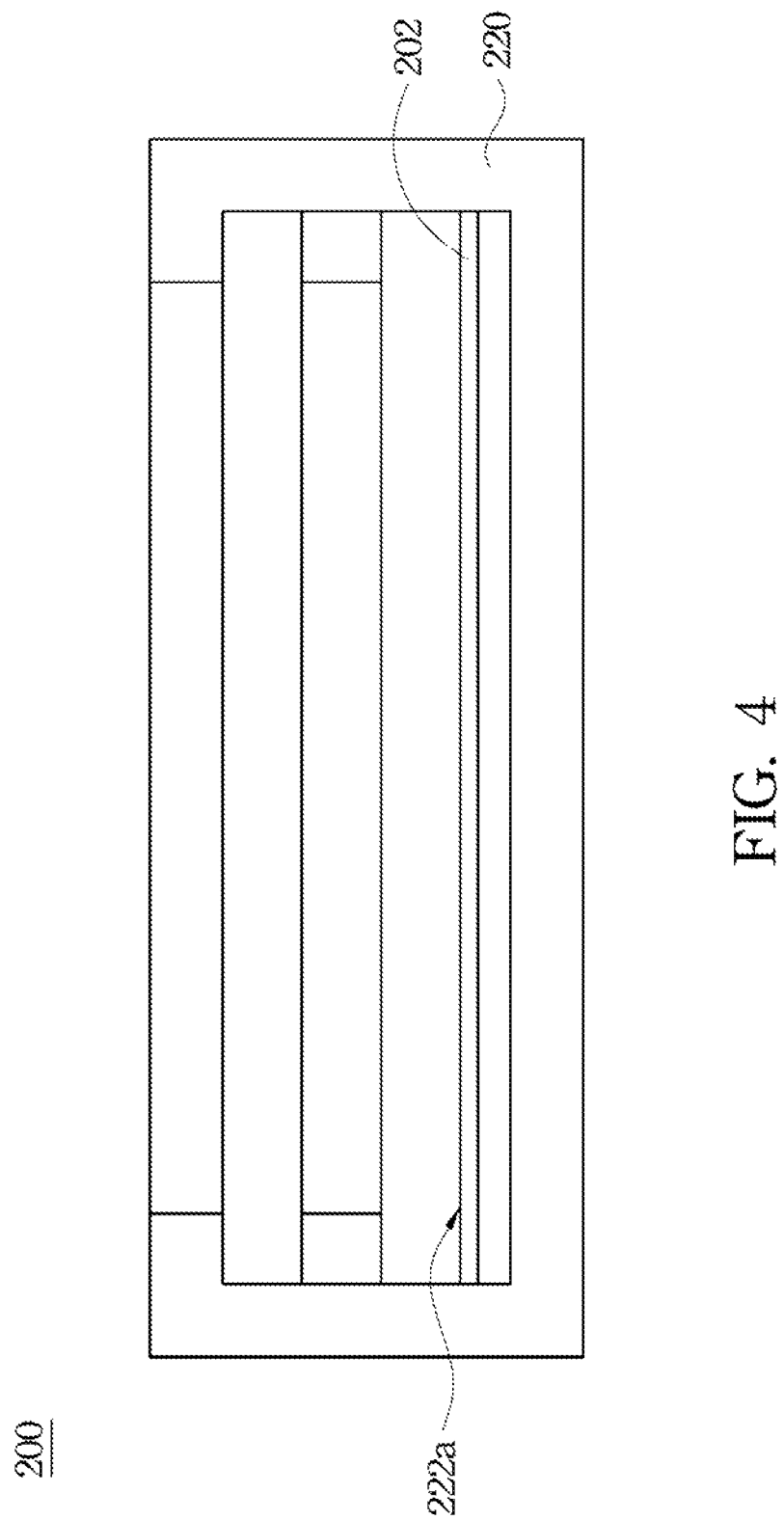
FIG. 4 is a schematic cross-sectional view of a flat illumination device according to another embodiment of the present invention.

Referring to FIG. 4, FIG. 4 is a schematic cross-sectional view of a flat illumination device 200 according to another embodiment of the present invention. The difference between the flat illumination device 200 shown in FIG. 4 and the flat illumination device 100 shown in FIG. 1 resides in the manners for disposing the reflective surface. As shown in FIG. 4, in the flat illumination device 200, a reflective surface 222a is provided by disposing a reflecting plate 202 in a frame 220, but the reflective surface 122a shown in FIG. 1 is formed on the inner wall 122 of the frame 120.

It can be known from the aforementioned embodiments that the flat illumination device of the present invention has the advantages of using the patterns formed from a plurality of mesh points or microstructures disposed on the first surface and/or the second surface of the light guide plate to achieve effects of providing a uniform light source and generating artistic patterns; using the reflective surface facing the first surface of the light guide plate to reflect the patterns formed on the first surface and/or a second surface of the light guide plate, thereby generating a pattern with the effect of depth of field, and achieving an image effect of multiple patterns.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A flat illumination device, comprising:

a frame comprising an inner wall, the inner wall having a reflective surface;

a light guide plate disposed in the frame, the light guide plate having:

a first surface and a second surface opposite to the first surface, wherein the first surface faces the reflective surface, and is spaced from the reflective surface at a distance, and at least one pattern formed from a plurality of mesh points or microstructures is disposed on at least one of the first surface and the second surface; and at least one light incident surface adjoining the first surface and the second surface; and at least one light source which is disposed in the frame and is adjacent to the at least one light incident surface for providing light to the light guide plate, wherein a virtual image of the at least one pattern with the effect of depth of field is generated as the at least one pattern is located in front of the reflective surface of the frame.

2. The flat illumination device of claim 1, wherein the first surface and the second surface both have the patterns disposed thereon.

3. The flat illumination device of claim 1, wherein the reflective surface comprises a planar surface.

4. The flat illumination device of claim 1, wherein the reflective surface comprises a curved surface.

5. The flat illumination device of claim 1, further comprising a lamp cover disposed on the frame for covering the light guide plate.

6. The flat illumination device of claim 1, wherein the virtual image of the at least one pattern is located behind the reflective surface of the frame.

7. The flat illumination device of claim 1, wherein the field of the depth of the virtual image of the at least one pattern is greater with the increase of the distance between the first surface and the reflective surface.

8. The flat illumination device of claim 1, wherein the reflective surface is a mirror polished surface.

9. A flat illumination device, comprising:
   a frame;
   a light guide plate disposed in the frame, the light, guide plate having:
      a first surface and a second surface opposite to the first surface, wherein at least one pattern formed from a plurality of mesh points or microstructures is disposed on at least one of the first surface and the second surface; and
      at least one light incident surface adjoining the first surface and the second surface; and
   a reflecting plate disposed in the frame, the reflecting plate having a reflective surface, wherein the reflective surface faces the first surface, and is spaced from the first surface at a distance; and
   at least one light source which is disposed in the frame and is adjacent to the at least one light incident surface for providing light to the light guide plate, wherein a virtual image of the at least one pattern with the effect of depth of field is generated as the at least one pattern is located in front of the reflective surface of the frame.

10. The flat illumination device of claim 9, wherein the first surface and the second surface both have the patterns disposed thereon.

11. The flat illumination device of claim 9, wherein the reflective surface comprises a planar surface.

12. The flat illumination device of claim 9, wherein the reflective surface comprises a curved surface.

13. The flat illumination device of claim 9, further comprising a lamp cover disposed on the frame for covering the light guide plate.

14. The flat illumination device of claim 9, wherein the virtual image of the at least one pattern is located behind the reflective surface of the frame.

15. The flat illumination device of claim 9, wherein the field of the depth of the virtual image of the at least one pattern is greater with the increase of the distance between the first surface and the reflective surface.

16. The flat illumination device of claim 9, wherein the reflective surface is a mirror polished surface.

\* \* \* \* \*